(12) United States Patent
Botha et al.

(10) Patent No.: US 6,892,653 B1
(45) Date of Patent: May 17, 2005

(54) SECURING AN ENCLOSED AREA

(75) Inventors: Daniël Christiaan Botha, Pretoria (ZA); Pieter Machaiel Oberholzer Van Greuning, Pretoria (ZA)

(73) Assignee: CSIR, Pretoria (ZA)

( * ) Notice: Subject to any disclaimer, the term of this patent is extended or adjusted under 35 U.S.C. 154(b) by 0 days.

(21) Appl. No.: 10/275,666

(22) PCT Filed: May 10, 2000

(86) PCT No.: PCT/IB00/00628

§ 371 (c)(1),
(2), (4) Date: Nov. 6, 2002

(87) PCT Pub. No.: WO01/85489

PCT Pub. Date: Nov. 15, 2001

(51) Int. Cl.⁷ .............................. E05B 1/00; G08B 15/02
(52) U.S. Cl. .............................. 109/29; 109/36; 109/33
(58) Field of Search .............................. 109/29, 32, 33, 109/34, 36, 37

(56) References Cited

U.S. PATENT DOCUMENTS

| | | | |
|---|---|---|---|
| 1,526,351 A | * | 2/1925 | Lawrence .................. 102/367 |
| 1,643,293 A | * | 9/1927 | Clarke .......................... 116/75 |
| 3,172,925 A | * | 3/1965 | Preotle ....................... 264/46.5 |
| 4,202,279 A | * | 5/1980 | Rand ............................ 109/34 |
| 4,461,222 A | | 7/1984 | Brunner et al. ............... 109/29 |
| 4,617,174 A | | 10/1986 | Bazelaire et al. ........... 422/133 |
| 5,388,433 A | * | 2/1995 | Andersson et al. .......... 70/57.1 |
| 6,568,336 B2 | * | 5/2003 | Van Lint ..................... 109/29 |

FOREIGN PATENT DOCUMENTS

| | | |
|---|---|---|
| DE | 3627496 | 4/1988 |
| EP | 397096 | 11/1990 |
| EP | 439434 | 7/1991 |

* cited by examiner

Primary Examiner—John B. Walsh
(74) Attorney, Agent, or Firm—Merchant & Gould P.C.

(57) ABSTRACT

A security apparatus (10) is provided in an enclosed area to be secured against an external threat, e.g. a load volume of a vehicle transporting valuables is secured against unauthorized entry. Two chemical components are contained separately. When a danger situation occurs, the security apparatus (10) is actuated via control means to expose the chemical components to each other and to mix them. After a predetermined, short, time period, the mixture is released and is distributed over the area being secured. Foaming and solidification take place in short time to occupy the enclosed area and to prevent entry and exit.

34 Claims, 4 Drawing Sheets

SECURING AN ENCLOSED AREA

THIS INVENTION relates to a method of and apparatus for securing an enclosed area against an external threat, e.g. against unauthorised entry.

The Applicant envisages that this invention will be particularly advantageously applicable to securing an enclosed volume in a vehicle against an external threat, e.g. against unauthorised entry, with a view to securing valuables, e.g. cash, in transit in the vehicle. That application will predominantly be borne in mind for purposes of this specification. The invention is, however, not limited to that application.

In accordance with a first aspect of this invention, there is provided a method of securing an enclosed area against an external threat, for example against unauthorised entry, the method including selectively mixing, for a predetermined short period, a plurality of predetermined liquid chemical components, the components being adapted, when mixed, in short time, to foam, to expand and to set;

distributing the mixture while substantially in liquid state and substantially before foaming commences, over the area;

allowing the mixture to foam at least partially to occupy the area, to set, and to block the area against entry or exit.

The method may include containing the respective liquid chemical components in separate compartments of a composite container, and exposing the components to each other or intercommunicating the compartments as a first step of mixing. Exposing the components to each other or intercommunicating the compartments may include forcefully breaching a division means between the compartments. Forcefully breaching the division means may be by moving or removing or breaking a division or divider between the compartments.

One species of method may include actuating electrical mixing means to commence mixing. In that species of method, actuating may include driving a ram through the division means to break it.

Another species of method may include actuating a detonator arranged to fracture the division means. That species of method may advantageously include pressurizing a respective compartment with pressure generated by the detonator to blow the division means out of its position.

Generally, in accordance with the method of the invention, when said separate compartments are adjacent a mixing chamber, the method may include causing the respective chemical components to flow into the mixing chamber, mixing taking place within the mixing chamber. The method may include mixing the liquid components by stirring. Stirring in the mixing chamber may be by means of a stirrer, conveniently in the form of a rotor.

The method may include, after a predetermined time period from the time of actuation, discharging the mixture from the container or the mixing chamber to distribute it over the area. Discharging the mixture from the container or the mixing chamber may include breaching a wall portion of the container or mixing chamber. The wall portion may conveniently be frangible and the method may thus include fracturing the wall portion, for example by releasing a pre-tensioned spring arranged to drive a fracturing member into said frangible wall portion. Instead, the wall portion may be fractured by detonating a detonator arranged to fracture the wall portion. Detonating the detonator may be such as to pressurise an area behind the wall portion with pressure generated by the detonator and to drive the wall portion from its position. The method may then include expelling the liquid mixture under pressure from the container or mixing chamber.

By way of development, the method may include hindering or retarding entry into the enclosed area by deploying a collapsible and extensible barricade member in the enclosed area by moving the barricade member from a collapsed condition in a stowed position to an extended condition in a deployed position in respect of the enclosed area.

Advantageously, mixing the plurality of liquid chemical components and deploying the barricade member may be in response to a signal generated by control means. The control means may generate said signal in response to manual actuation or automatically in response to a sensor sensing a danger situation. When said enclosed area is a load area of a vehicle, said sensor may be arranged to be triggered by impact, such as impact occurring during an accident.

In accordance with a second aspect of this invention, there is provided a securing arrangement suitable for use in securing an enclosed area against external threat such as against unauthorized entry, the securing arrangement comprising a composite container including separate compartments respectively containing liquid chemical components adapted, when mixed, in short time, to foam, to expand and to set;

division means between the compartments which division means is readily breachable to intercommunicate the compartments;

mixing means to mix the liquid chemical components; and control means to cause mixing for a predetermined period and then to cause the mixture to be discharged while substantially still in a liquid state prior to foaming.

In one species of embodiment, the mixing means may include a shaft carrying a stirring head and being drivingly connected to a rotary motor, advantageously a direct current electric motor, which may, for example, be powered from a battery of electrical cells, e.g. a motor vehicle battery.

Advantageously, the shaft may be extensible to act as a ram to breach the division means. The shaft may be in two portions which are interconnected by means of a bendix drive to extend one portion to act as a ram.

The separate compartments for the respective chemical liquids may be adjacent a mixing chamber and may be compartmentalized by means of frangible division means dividing the compartments and the mixing chamber. Then, the securing arrangement may include detonators arranged, when actuated, to fracture the division means to communicate the compartments with the mixing chamber. Advantageously, the detonators may be arranged to pressurize the compartments to blow the respective division means out of their positions.

The arrangement of the respective compartments adjacent the mixing chamber may advantageously be such that said division means prevents intercommunication, and such that the respective compartments dump their contents into the mixing chamber when the division means is breached and the compartments are pressurized.

Generally, the composite container may have a discharge gate to discharge the liquid after mixing has taken place and prior to commencement of substantial foaming. The discharge gate may be in the form of a frangible division in the form of a wall portion of the container, the securing arrangement including breaking means to fracture the division.

In one species of embodiment, the breaking means may be in the form of a spring biassed lever, which is released by means of the control means. In use, when released, the lever will be propelled by means of its spring bias to impinge on and fracture the division.

Instead, the breaking means may include one or more detonators actuable by means of the control means and arranged to fracture the division when actuated. The detonators may be arranged, when actuated, to pressurize the mixing chamber to blow the fractured division out of its position.

Generally, the control means may be adapted to actuate the mixing means and the breaking means, the control means being triggerable selectively or when a predetermined danger situation arises.

The control means may be electrical. The control means may include a time delay means or component adapted to actuate the breaking means a predetermined time period after actuation has commenced, to discharge the mixture before substantial foaming commences.

In a preferred application, the enclosed area may be a load area of a vehicle. Then, the control means may be triggerable in the event of an accident involving the vehicle.

By way of development, the securing arrangement may include hindering or retarding means suitable for use in hindering or retarding unauthorised entry into the enclosed area, the hindering or retarding means including a collapsible and extensible barricade member movable between a stowed condition in which it is stowed in its collapsed condition, and a deployed condition in which it is deployed in its extended condition;

deployment means adapted to move the barricade member rapidly from its stowed to its deployed condition; and a trigger adapted to trigger the deployment means.

In use, the barricade member will hinder or retard entry to allow the chemical mixture sufficient time to be formed, to foam, to expand and to set.

The barricade member may be in the form of one or more rolls of resilient barbed or prickled wire.

The deployment means may then be provided at least partially by inherent resilience of the wire. Instead, or in addition, the deployment means may include resilient bias means to cast the barricade member into a predetermined direction. The securing arrangement may then include a shutter arranged to hold the barricade member against resilient bias in its stowed condition, the trigger being connected to the shutter to open the shutter or to allow the shutter to open.

In an advantageous application, the enclosed area may be a load area of a vehicle and the trigger may be a composite trigger allowing manual operation, and also being automatically operable when an accident situation involving the vehicle takes place. Thus, the securing arrangement may include an automatic trigger means responsive to high impact.

The invention is now described by way of example with reference to the accompanying diagrammatic drawings. In the drawings FIG. 1 shows, in axial section, a first embodiment of security apparatus in accordance with the invention;

Figure 1:
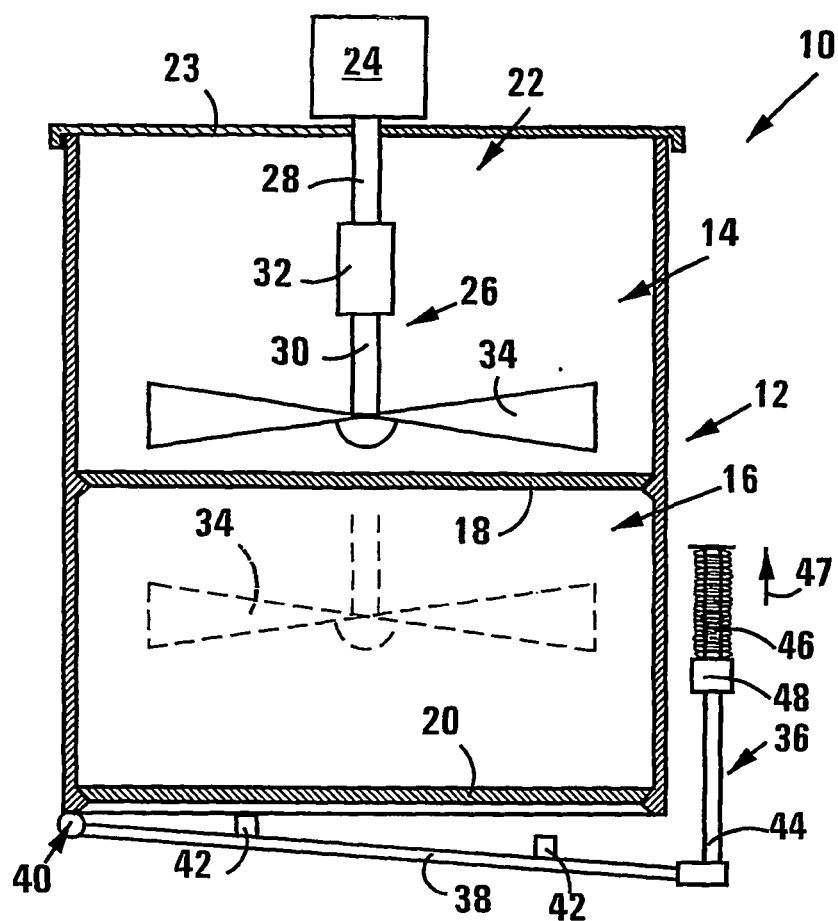

With reference to FIG. 1 of the drawings, a security apparatus in accordance with the invention and in the form of a foam generator, is generally indicated by reference numeral 10. The foam generator 10 is intended to be installed in an area which is to be secured against an external threat, e.g. against unauthorised entry. Such an area may, advantageously, be a load compartment of a vehicle such as the security vehicle of FIG. 3.

The foam generator 10 comprises a composite container 12 which, in this embodiment, is in the form of a drum or barrel having two separate compartments superimposed on each other. A first compartment 14 is directly above a second compartment 16, and the first and second compartments are compartmentalized by means of a glass division 18. The glass division 18 may have one or more score lines to render it easily frangible. Similarly, a bottom of the container 12 is formed by a glass partition 20 which, likewise, may have one or more score lines to render it easily frangible. Instead, the divisions or partitions may each be of a material (e.g. an appropriate type of glass) which is easily frangible, e.g. without lines or areas of weakness having to be provided. In use, chemical components are contained in the respective compartments. The chemical components are adapted, when mixed, to foam, to expand and to set in short time.

The composite container 12 has, installed therein, mixing means generally indicated by reference numeral 22. The mixing means 22 is conveniently mounted on an upper lid or cover 23. The mixing means 22 comprises an electric motor 24 which is conveniently a direct current electric motor operable from 12V or 24V such that it is directly connectable to an electrical system of a security vehicle. The mixing means 22 further comprises a composite shaft 26 comprising a fixed section 28 drivingly connected to the electric motor 24, an extensible section 30 in series with the fixed section 28, and a bendix drive 32 drivingly and extensible interconnecting the extensible section 30 to the fixed section 28. The mixing means 22 further comprises a stirrer or mixing rotor 34 carried at a free end of the extensible section 30. Instead of rendering the shaft extensible and rendering the drive means suitable to extend the shaft, ram-fashion, other appropriate and advantageous means may be employed to intercommunicate the partitions. Such means may be separate from the rotary drive means of the stirrer or rotor.

The foam generator 10 further comprises breaking means generally indicated by reference numeral 36. The breaking means 36 is associated with the bottom glass partition 20. It comprises a lever 38 pivoted at one position on the periphery of the container 12 as indicated as by reference numeral 40 and extending generally diametrically below the bottom of the container 12. At a free end thereof, it is connected to an upwardly extending shaft 44 extending alongside a periphery of the composite container 12. The shaft 44 extends through a trigger mechanism 48 and through a coil spring 46 acting in compression between the trigger mechanism 48 and a stop at the end of the shaft 44. In use, when the trigger mechanism 48 is released, the shaft 44 is driven upwardly as shown at 47 by means of the coil spring 46 such that protrusions 42 provided for that purpose on the lever 38 impinge on the glass partition 20 to break it. In other embodiments, discharge of the mixture prior to foaming may be achieved by other breaking and discharging means.

In use, when a threatening situation happens, or is developing, the security apparatus 10 is actuated. This can be effected manually, for example by a driver of the security vehicle, or it can happen automatically, for example in response to impact such as impact due to a collision.

When actuated, the electric motor 24 rotates the shaft 26. The bendix drive 32, in known manner, extends the extensible section 30 such that the shaft 26 acts as a ram, impinges on the glass division 18 and breaks the glass division 18. It extends further to a position shown in dotted 34 i.e. within the second compartment. The rotor or stirrer 34 is rotated. The first chemical component in the first compartment 14 and the second chemical component in the second compartment 16 are communicated, and are thoroughly mixed by means of the stirrer 34. It is to be appreciated that the direct current electric motor 24 can be of relatively high power as, as will appear below, it is not required to operate for very long. It may, for example, be similar to or even be a starter motor of a vehicle.

The chemical components are thoroughly mixed for a short, predetermined time. After said predetermined time from actuating the security apparatus, the trigger mechanism 48 is triggered to break the glass partition 20 as explained above. The predetermined time period will be in the order of about ten to fifteen seconds and it is emphasised that, when the security apparatus is actuated, a time delay mechanism is simultaneously actuated. The time delay mechanism will be adapted to generate a signal after said predetermined time period to actuate the trigger mechanism 48.

The predetermined time delay period is calculated to ensure that the chemical components are thoroughly mixed, and that the mixture is still in liquid state i.e. prior to foaming taking place.

When the glass partition 20 is broken, the mixture in liquid state is discharged from the composite container 12 over the area to be secured. The predetermined time period is calculated also such that, immediately after discharge, foaming will commence to cause foam at least partially to fill the area to be secured. As mentioned above, the foam very quickly, in seconds, starts to solidify and to set and become hard in short time. Thus, entry into (and exit from) the area to be secured is prevented.

Figure 2:
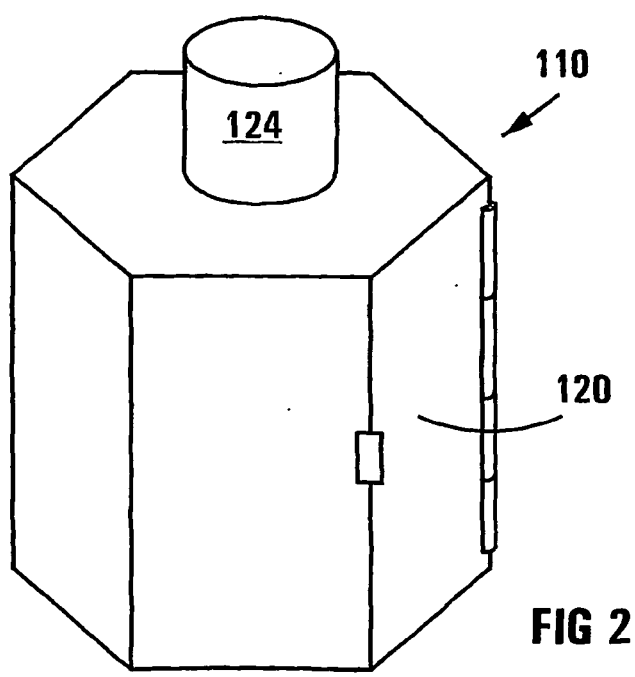
FIG. 2 shows, in three dimensional view, a variation of the first embodiment of security apparatus in accordance with the invention.

With reference to FIG. 2, another embodiment of security apparatus similar to the security apparatus 10 is generally indicated by reference numeral 110. The security apparatus 110 is of polygonal section, for example hexagonal, or octagonal. One of its sides indicated by reference numeral 120 forms a discharge gate instead of the frangible partition 20 of the embodiment of FIG. 1. The side 120 is hinged and can be opened under resilient bias or the like.

Figure 3:
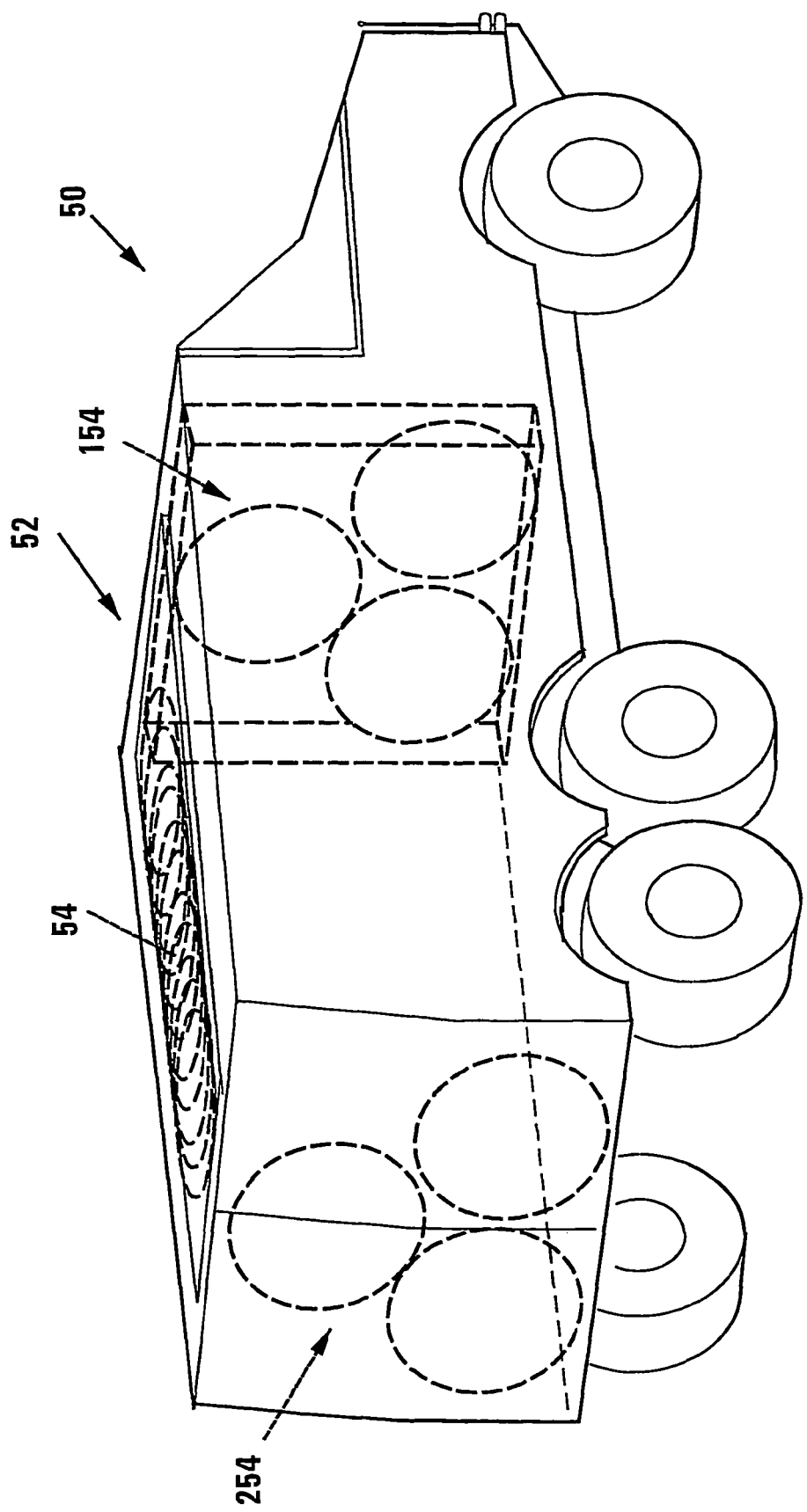
FIG. 3 shows, in three dimensional rear view, a security vehicle in accordance with the invention.

With reference to FIG. 3, a security vehicle in accordance with the invention is generally indicated by reference numeral 50. It has a load compartment 52 for transport of articles, such as valuables, for example cash. In the context of this invention, the load compartment 52 is an enclosed area which is secured in accordance with the invention.

In the embodiment of FIG. 3, the load compartment 52 is secured by means of one or more rolls of barbed or prickled wire. It is shown that such a roll or rolls of barbed or prickled wire, indicated by reference numeral 54, are stowed in collapsed condition in a compartment in or against a roof of the load compartment 52. (The rolls are collapsed or compressed in a transverse direction to become generally elongate planar.) In use, automatically when a threatening situation comes about or is developing, or selectively, or by any one of automatically or selectively, the compartment can be opened e.g. a shutter forming a door of the compartment can be swung open or pulled away sluice fashion, to allow the roll or rolls of wire, under inherent resilience of the wire, to be cast across a floor of the load compartment 52 to form a barricade against entry of the load compartment.

If desired, one or more rolls of barbed or prickled wire can be provided against a front end of the load compartment 52 as indicated by reference numeral 154, or against a rear end of the load compartment as indicated by reference numeral 254. The rolls are shown to be collapsed or compressed in an axial direction. Yet a further option would be to collapse or compress the rolls axially and stowing them in the roof to allow them to be deployed in column-format.

It is to be appreciated that, instead of the roll or rolls of barbed of prickled wire, the security device 10 or the security device 110 or similar security device in accordance with the invention, can be installed in the load compartment 52 to secure the load compartment by at least partially filling it with expandable and setable foam as described above. Advantageously, the security apparatus may be mounted on a gimbal to ensure that it remains upright and that its discharge opening will appropriately discharge and distribute the liquid after mixing and before foaming.

By way of development, both the roll or rolls of barbed or prickled wire and the security device in accordance with the invention can be provided in the load compartment 52 such that both systems are operable to secure the load compartment. In such an embodiment, the barbed or prickled wire will immediately bar access to the load compartment to hinder unauthorised entry to allow the security apparatus or foam generator 10 sufficient time to generate foam and for the foam to start solidifying and to start setting, further to secure the load compartment.

It is regarded as a first advantage that a relatively simple system i.e. the system illustrated in FIG. 3, is provided to hinder or retard entry into an enclosed area to be secured to allow other measures to be put into place to prevent or stop unauthorised entry. It is emphasised that such a simple system will be used where articles which are of value, but not considerable value, such as small amounts of cash, are transported.

It is a further advantage that a more elaborate and more effective system, namely the system illustrated in FIG. 1, is provided, more effectively to secure an enclosed area against unauthorised entry.

It is yet a further advantage that the systems disclosed herein can be used in conjunction to form a very effective composite system to secure an enclosed area against unauthorised entry.

It is emphasized that this invention will be particulary effective to secure large amounts of cash in transit.

Figure 4:
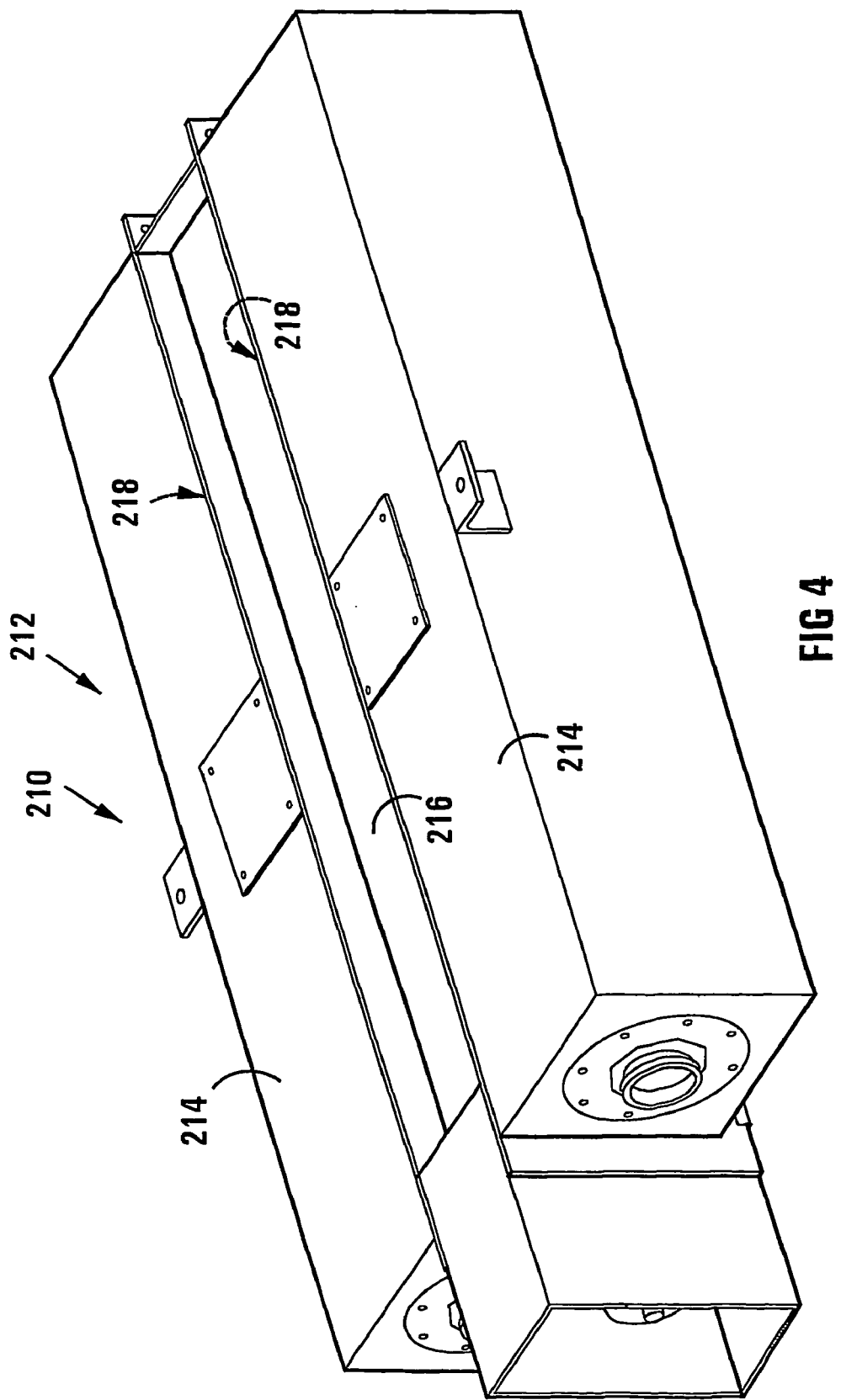
FIG. 4 shows, in three dimensional view, a third embodiment of security apparatus in accordance with the invention.
Figure 5:
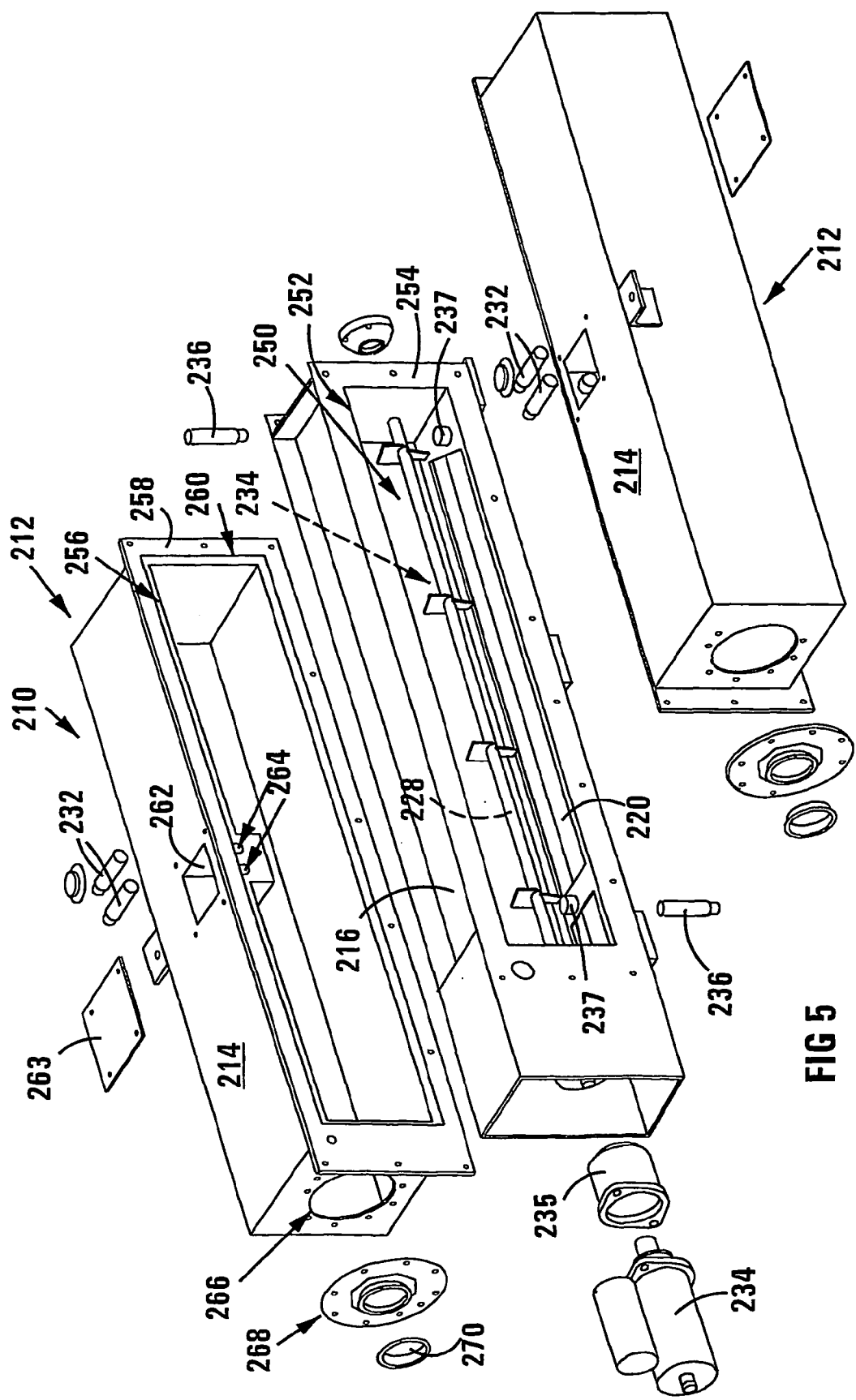
FIG. 5 shows a view corresponding to FIG. 4 but in exploded format.

With reference to FIGS. 4 and 5, a third embodiment of security apparatus in accordance with this invention is generally indicated by reference numeral 210. The embodiment 210 includes many of the features of the embodiment of claim 1, and, where applicable, like reference numerals are used to denote like components or features.

The embodiment of FIGS. 4 and 5 further has generally the same advantages as those described with reference to FIG. 1, and it includes also further advantages which will be mentioned, by way of example, herebelow.

The security apparatus 210 is in the form of a foam generator having a central mixing chamber 216 flanked by compartments 214 which are mirror images for practical purposes and of which only one will be described. The mixing chamber 216 and the compartments 214 are interconnected and the unit can releasably be secured, for example, internally of a roof of a vehicle by means of apertured lugs provided for that purpose at sides of the compartments 214.

The mixing chamber 216 has an interior 250. Within the interior 250, a stirrer 234 is rotatably supported in bushes or bearings. At one end of the mixing chamber 216, it has a recessed hollow which houses an electric motor 234 drivingly connected to a shaft 228 of the stirrer 234. The electric motor 234 is mounted in the hollow by means of a mounting gland 235. In use, the electric motor 234 is electrically connected by means of a circuit including control means in accordance with the invention to a battery, for example a battery of a vehicle within which the security apparatus 210 may be used.

The mixing chamber 216 is generally of elongate box shape. In sides thereof, it has large openings 252 framed by peripheral frames 254.

In the floor of the mixing chamber 216, it has a large opening 220.

In the floor of the mixing chamber 216, there are provided two sockets 237 respectively toward opposed ends of the mixing chamber 216 within which sockets 237 detonators 236 are provided.

Each compartment 214, of which one only is described, has a lateral opening 256 in a side thereof. The opening 256 corresponds to one of the openings 252 of the mixing chamber 216. The compartment 214 includes a peripheral flange framing the opening 256 and defining, at the periphery of the opening 256, a recessed peripheral seat 260 for a glass partition, the position of which is shown at 218 in FIG. 4.

The compartment 214 is replaceably mounted via its flange 258 to one side of the mixing chamber 216. The other compartment 214 is mounted in like fashion to an opposed side of the mixing chamber 216.

The mixing chamber 214 includes a recessed cubby 262 in a top thereof. The recess cubby 262 has a pair of ports 264 and houses a pair of detonators 232. A cover 263 is removably screwable over an open top of the cubby 262.

At one end of the compartment 214, it has a charge opening 266 on which a flanged collar 268 is screwed. A lid 270 is replaceably securable on the collar 268.

The compartments 214 are charged via the lids 270 with the predetermined chemicals.

In use, when a danger or accident situation occurs, and the control means is triggered, either selectively or automatically, for example by impact, the detonators 232 in the cubbies 262 are detonated. Detonation fractures the glass panels 218 and the respective compartments 214 are communicated with the mixing chamber via the openings 256, 252. The pressure of detonation of the detonators 232 blasts the contents of the compartments 214 out of the compartments and into the mixing chamber 216.

Simultaneously, the electric motor 234 is activated to drive the stirrer 234 to mix the chemical components.

After a predetermined time delay calculated to allow thorough mixing of the chemical components, but before substantial foaming takes place, the detonators 236 are detonated to fracture a panel covering the opening 220 in the floor of the mixing chamber 216. Thus, the chemical mixture is discharged, amplified by pressure generated by the detonation of the detonators 236, out of the mixing chamber 216 into and over the area being secured by the security apparatus 210.

Expansion and solidification of the foam, in a manner similar to what was described above, fill the area being secured to prevent entry and exit.

The embodiment of FIGS. 4 and 5 has, as a first additional advantage, a more compact construction in respect of the compartments and mixing chamber. Furthermore, fracturing of the partitions 218 and later fracturing of the floor 220 of the mixing chamber are effected neatly by way of detonators which are inexpensive to provide, and which furthermore generate pressure to enhance discharge of the two chemical compounds and later of the chemical mixture.

It is further an advantage that each of the compartments 214 can easily be charged or replenished via their lids 270.

What is claimed is:

1. A method of securing an enclosed area against an external threat, the method including
    containing, in separate compartments of a composite container, a plurality of predetermined liquid chemical components, the components being adapted, when mixed, in short time, to foam, to expand and to set;
    selectively mixing, for a predetermined short period, the respective liquid chemical components, mixing including forcefully breaking a division means in the form of at least one wall of frangible material between the compartments to expose the components to each other or to intercommunicate the compartments;
    distributing the mixture while substantially in liquid state and substantially before foaming commences, over the area;
    allowing the mixture to foam at least partially to occupy the area, to set, and to block the area against entry or exit.

2. A method as claimed in claim 1 which includes actuating electrical mixing means to commence mixing, actuating including driving a ram through the division means to break it.

3. A method as claimed in claim 1 which includes actuating a detonator arranged to fracture the division means and pressurizing a respective compartment with pressure generated by the detonator to blow the division means out of its position.

4. A method as claimed in claim 1, in which said separate compartments are adjacent a mixing chamber and are separated from the mixing chamber by respective walls of frangible material, the method including breaking said walls and causing the respective chemical components to flow into the mixing chamber, mixing taking place within the mixing chamber.

5. A method as claimed in claim 1, which includes mixing the liquid components by stirring.

6. A method as claimed in claim 4, which includes mixing the liquid components by stirring, said stirring being in the mixing chamber by means of a stirrer.

7. A method as claimed in claim 1 which includes, after a predetermined time period from the time of actuation, discharging the mixture from the container or the mixing chamber by fracturing a wall portion of the container or mixing chamber to distribute the mixture over the area.

8. A method as claimed in claim 7 in which the wall portion is fractured by releasing a pre-tensioned spring arranged to drive a fracturing member into said frangible wall portion.

9. A method as claimed in claim 7 which includes detonating a detonator arranged to fracture the wall portion.

10. A method as claimed in claim 9 which includes pressurising an area behind the wall portion with pressure generated by the detonator and to drive the wall portion from its position.

11. A method as claimed in claim 10 which includes expelling the liquid mixture from the container or mixing chamber under said pressure generated by the detonator.

12. A method as claimed in claim 1 which includes hindering or retarding entry into the enclosed area by deploying a collapsible and extensible barricade member in the form of a roll of barbed or prickled wire in the enclosed area by moving the barricade member from a collapsed condition in a stowed position to an extended condition in a deployed position in respect of the enclosed area.

13. A method as claimed in claim 12 in which mixing the plurality of liquid chemical components and deploying the barricade member are in response to a signal generated by control means.

14. A method as claimed in claim 13 in which the control means generates said signal in response to manual actuation or automatically in response to sensing a danger situation.

15. A method as claimed in claim 14 in which said enclosed area is a load area of a vehicle and in which said sensor is arranged to be triggered by impact.

16. A securing arrangement suitable for use in securing an enclosed area against external threat in accordance with the method of claim 1, the securing arrangement comprising
   a composite container including separate compartments respectively containing liquid chemical components adapted, when mixed, in short time, to foam, to expand and to set;
   division means in the form of at least one wall of frangible material between the compartments which division means is readily breakable to intercommunicate the compartments;
   mixing means to mix the liquid chemical components; and
   control means to cause mixing for a predetermined period and then to cause the mixture to be discharged while substantially still in a liquid state prior to foaming.

17. A securing arrangement as claimed in claim 16 in which the mixing means includes a shaft carrying a stirring head and being drivingly connected to a rotary motor.

18. A securing arrangement as claimed in claim 17 in which the rotary motor is a direct current electric motor.

19. A securing arrangement as claimed in claim 17 in which the shaft is extensible to act as a ram to breach the division means.

20. A securing arrangement as claimed in claim 19, in which the shaft is in two portions being interconnected by means of a bendix drive to extend one portion to act as a ram.

21. A securing arrangement as claimed in claim 16, in which the separate compartments for the respective chemical liquids are adjacent a mixing chamber and are compartmentalized by means of frangible division means dividing the compartments and the mixing chamber, the securing arrangement including detonators arranged, when actuated, to fracture the division means to communicate the compartments with the mixing chamber.

22. A securing arrangement as claimed in claim 21 in which the detonators are arranged to pressurize the compartments to blow the respective division means out of their positions.

23. A securing arrangement as claimed in claim 22 in which arrangement of the respective compartments adjacent the mixing chamber is such that said division means prevents intercommunication, and such that the respective compartments dump their contents into the mixing chamber when the division means is fractured and the compartments are pressurized.

24. A securing arrangement as claimed in claim 16 in which the composite container has a discharge gate to discharge the liquid after mixing has taken place and prior to commencement of substantial foaming, the discharge gate being in the form of a frangible division in the form of a wall portion of the container, the securing arrangement including breaking means to fracture the division.

25. A securing arrangement as claimed in claim 24 in which the breaking means is in the form of a spring biassed lever, which is released by means of the control means.

26. A securing arrangement as claimed in claim 24 in which the breaking means includes one or more detonators actuable by means of the control means and arranged to fracture the division when actuated.

27. A securing arrangement as claimed in claim 26 in which the detonators are arranged, when actuated, to pressurize the mixing chamber to blow the fractured division out of its position.

28. A securing arrangement as claimed in claim 16, in which the enclosed area is a load area of a vehicle, in which the control means is triggerable selectively or when an accident situation arises.

29. A securing arrangement as claimed in claim 16 which includes hindering or retarding means suitable for use in hindering or retarding unauthorised entry into the enclosed area, the hindering or retarding means including
   at least one collapsible and extensible barricade member in the form of a roll of resilient barbed or prickled wire movable between a stowed condition in which the barricade member is stowed in its collapsed condition, and a deployed condition in which the barricade member is deployed in its extended condition;
   deployment means adapted to move the barricade member rapidly from its stowed to its deployed condition; and
   a trigger adapted to trigger the deployment means.

30. A securing arrangement as claimed in claim 29 in which the deployment means is provided at least partially by inherent resilience of the wire.

31. A securing arrangement as claimed in claim 29 in which the deployment means includes resilient bias means to cast the barricade member into a predetermined direction.

32. A securing arrangement as claimed in claim 31 which includes a shutter arranged to hold the barricade member against resilient bias in its stowed condition, the trigger being connected to the shutter to open the shutter or to allow the shutter to open.

33. A securing arrangement as claimed in claim 29 in which the enclosed area is a load area of a vehicle and in which the trigger is a composite trigger allowing manual operation, and is also automatically operable when an accident situation involving the vehicle takes place.

34. A securing arrangement as claimed in claim 33 which includes an automatic trigger means responsive to high impact.

\* \* \* \* \*